(12) United States Patent  
Tsao et al.

(10) Patent No.: US 8,330,921 B2
(45) Date of Patent: Dec. 11, 2012

(54) PIXEL STRUCTURE AND DISPLAY PANEL

(75) Inventors: Cheng-Han Tsao, Taipei County (TW); Ting-Yi Cho, Taipei (TW); Chung-Yi Chiu, Tainan County (TW)

(73) Assignee: Au Optronics Corporation, Hsinchu (TW)

( * ) Notice: Subject to any disclaimer, the term of this patent is extended or adjusted under 35 U.S.C. 154(b) by 373 days.

(21) Appl. No.: 12/755,427

(22) Filed: Apr. 7, 2010

(65) Prior Publication Data

US 2011/0149223 A1  Jun. 23, 2011

(30) Foreign Application Priority Data

Dec. 22, 2009  (TW) .............................. 98144320 A

(51) Int. Cl.
G02F 1/1343  (2006.01)
G02F 1/1337  (2006.01)
(52) U.S. Cl. ........................ 349/141; 349/129
(58) Field of Classification Search ......................... None
See application file for complete search history.

(56) References Cited

U.S. PATENT DOCUMENTS

| 6,384,889 B1 | 5/2002 | Miyachi et al. | |
| 8,189,153 B2 * | 5/2012 | Ting et al. ..................... | 349/129 |
| 2003/0048401 A1 | 3/2003 | Hanaoka et al. | |
| 2003/0137628 A1 * | 7/2003 | Nagaoka ....................... | 349/141 |
| 2009/0310075 A1 * | 12/2009 | Kim .............................. | 349/144 |
| 2010/0195034 A1 * | 8/2010 | Lee et al. ....................... | 349/124 |

FOREIGN PATENT DOCUMENTS

| CN | 1570745 | 1/2005 |
| CN | 1959507 | 5/2007 |
| CN | 101145568 | 3/2008 |

OTHER PUBLICATIONS

"First Office Action of China Counterpart Application", issued on Dec. 1, 2010, p. 1-p. 6, in which the listed references were cited.

* cited by examiner

Primary Examiner — Tina Wong
(74) Attorney, Agent, or Firm — Jianq Chyun IP Office

(57) ABSTRACT

A pixel structure including a substrate, a scan line, a data line, an active device, a capacitor electrode line, an upper electrode pattern and a pixel electrode is described. The scan line and the data line are disposed on the substrate. The active device is electrically connected to the scan line and the data line. The capacitor electrode is disposed on the substrate. The upper electrode pattern is disposed above the capacitor electrode line, and the upper electrode pattern has a first opening therein to expose the capacitor electrode pattern. The pixel electrode is electrically connected with the active device and covers the capacitor electrode line and the upper electrode pattern, wherein the pixel electrode has a middle portion and a plurality of branches connecting to the middle portion, and the middle portion has a second opening therein to expose the first opening.

17 Claims, 10 Drawing Sheets

PIXEL STRUCTURE AND DISPLAY PANEL

CROSS-REFERENCE TO RELATED APPLICATION

This application claims the priority benefit of Taiwan application serial no. 98144320, filed on Dec. 22, 2009. The entirety of the above-mentioned patent application is hereby incorporated by reference herein and made a part of specification.

BACKGROUND OF THE INVENTION

1. Field of the Invention

The present invention relates to a pixel structure and a display panel having the same, and particularly to a pixel structure and a display panel having the same using polymer stabilized alignment (PSA) technique.

2. Description of Related Art

In the development of the display, with the progress in the optoelectronic techniques and the semiconductor manufacturing techniques, the liquid crystal display with the advantages of high definition, optimal space utilization, low power consumption, and no radiation has gradually become the main stream of the market.

A liquid crystal display includes a backlight module and a liquid crystal display panel, and a conventional liquid crystal display panel is composed by two substrates and a liquid crystal layer between the two substrates. Generally speaking, when the liquid crystal panel is manufactured, alignment films will be formed on the two substrates, such that liquid crystal molecules are aligned in a specific manner. A conventional method of forming the alignment films is coating an alignment material first, and then performing an alignment process on the alignment material. The alignment process can be classified into a contact alignment process and a non-contact alignment process. Though the non-contact alignment process solves the problems of electrostatics and particle contamination in the contact friction alignment, it often leads to the problem of insufficient anchoring energy on alignment surfaces. Insufficient anchoring energy of an alignment surface may result in bad display quality of the LCD panel.

In order to solve the above problems, a polymer stabilized alignment (PSA) technology has been developed. According to this technology, high molecular monomers of an appropriate concentration are doped into the liquid crystal material and are vibrated to an even state. Next, the mixed liquid crystal material is heated to an isotropy state on a heater. Then, when the liquid crystal mixture is cooled to the ambient temperature of 25° C., the liquid crystal mixture returns to a nematic state. At this time, the liquid crystal mixture is injected into the liquid crystal cell, and a voltage is applied thereon. When the arrangement of the liquid crystal molecules is stabilized, the high molecular monomers are bonded to form a polymer layer by means of UV curing or heating, so as to realize the stabilized alignment Generally speaking, in the PSA LCD panel, alignment slits are formed in the pixel electrode of a pixel structure, so as to allow liquid crystal molecules to have specific alignment directions. The alignment of the liquid crystal molecules is more accurate if more of the alignment slits are formed in the pixel electrode. Since the alignment slits may have non-identical widths due to the photolithography process, more display mura may be generated when the alignment slits occupy more areas of the pixel electrode. For details, in the photolithography process of the alignment slits, the exposing condition at an interface region between optical devices of an exposure apparatus is different from the exposing condition at a non-interface region, and thereby the slits formed in the interface region may have a width different from that of the slits formed in the non-interface region. Therefore, the brightness of these two regions is different and display mura is generated on the display panel.

SUMMARY OF THE INVENTION

The present invention is directed to a pixel structure and a display panel having the same, which are capable of reducing display mura generated from the alignment slits having non-identical widths in a PSA display panel.

A pixel structure including a substrate, a scan line, a data line, an active device, a capacitor electrode line, an upper electrode pattern and a pixel electrode is described. The scan line and the data line are disposed on the substrate. The active device is electrically connected to the scan line and the data line. The capacitor electrode line is disposed on the substrate. The upper electrode pattern is disposed above the capacitor electrode line, and the upper electrode pattern has a first opening therein to expose the capacitor electrode line. The pixel electrode is electrically connected with the active device and covers the capacitor electrode line and the upper electrode pattern, wherein the pixel electrode has a middle portion and a plurality of branches connecting to the middle portion, and the middle portion has a second opening therein to expose the first opening.

A display panel including a first substrate, a second substrate, and a display medium between the first substrate and the second substrate is provided. The first substrate has a plurality of pixel structures, and each pixel structure is as above mentioned. The second substrate is disposed opposite to the first substrate and has an electrode layer thereon.

According to the aforementioned, the upper electrode pattern of the pixel structure has the first opening therein, and the middle portion of the pixel electrode has the second opening therein. When a curing process of the PSA technology is performed, the liquid crystal molecules are aligned by the high voltage which is applied to the capacitor electrode line through the first opening and the second opening, so that the liquid crystal molecules have specific pre-tilt angles. Therefore, the area of the pixel electrode is increased and the area occupied by the alignment slits is decreased, such that the display mura generated from the alignment slits having non-identical widths owing to the photolithography process is reduced.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
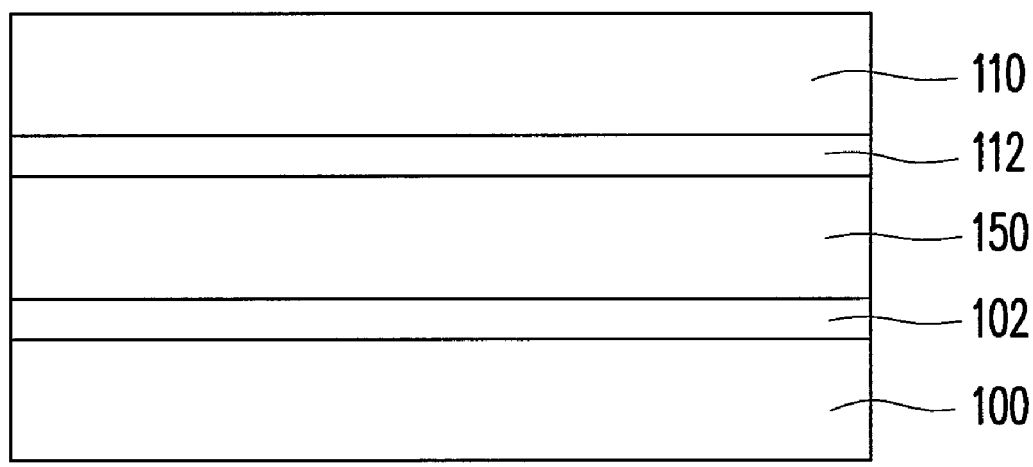
FIG. 1 is a schematic cross-sectional view of a display panel according to an embodiment of the present invention.

FIG. 1 is a schematic cross-sectional view of a display panel according to an embodiment of the present invention. Referring to FIG. 1, the display panel of the present embodiment includes a first substrate 100, a second substrate 110, and a display medium 150 between the first substrate 100 and the second substrate 110.

The first substrate 100 can be made of glass, quartz, an organic material or a metal. The first substrate 100 has a pixel array layer 102 thereon, and the pixel array layer 102 includes a plurality of pixel structures. The pixel structures of the pixel array layer 102 are described in the subsequent paragraphs.

The second substrate 110 can be made of glass, quartz, an organic material or the like. An electrode layer 112 is disposed on the second substrate 110. In the embodiment, the electrode layer 112 is a transparent electrode layer and can be, for example, made of indium tin oxide (ITO) or indium zinc oxide (IZO). The electrode layer 112 completely covers the second substrate 110. According to the embodiment, there is not any alignment pattern (such as alignment protrusions or alignment slits) disposed on or in the electrode layer 112. In addition, according to another embodiment, a color filter array (not shown), which comprises red, green and blue filter patterns, can also be disposed on the second substrate 110. Moreover, a light shielding pattern layer (not shown) may also be disposed on the second substrate 110 and disposed between the patterns of the color filter array, and it is also called a black matrix.

The display medium 150 comprises liquid crystal molecules. Because the display panel of the embodiment is a PSA display panel, the display medium 150 comprises the liquid crystal molecules and monomers. In other words, before a curing process is performed to the monomers in the display panel, the display medium 150 comprises the liquid crystal molecules and the monomers. When the curing process is performed to the monomers in the display panel, the monomers are polymerized to form a thin film on the surfaces of the pixel array layer 102 and the electrode layer 112. Therefore, after the curing process for the monomers in the display panel, the display medium 150 is mainly comprised of the liquid crystal molecules.

Figure 2A:
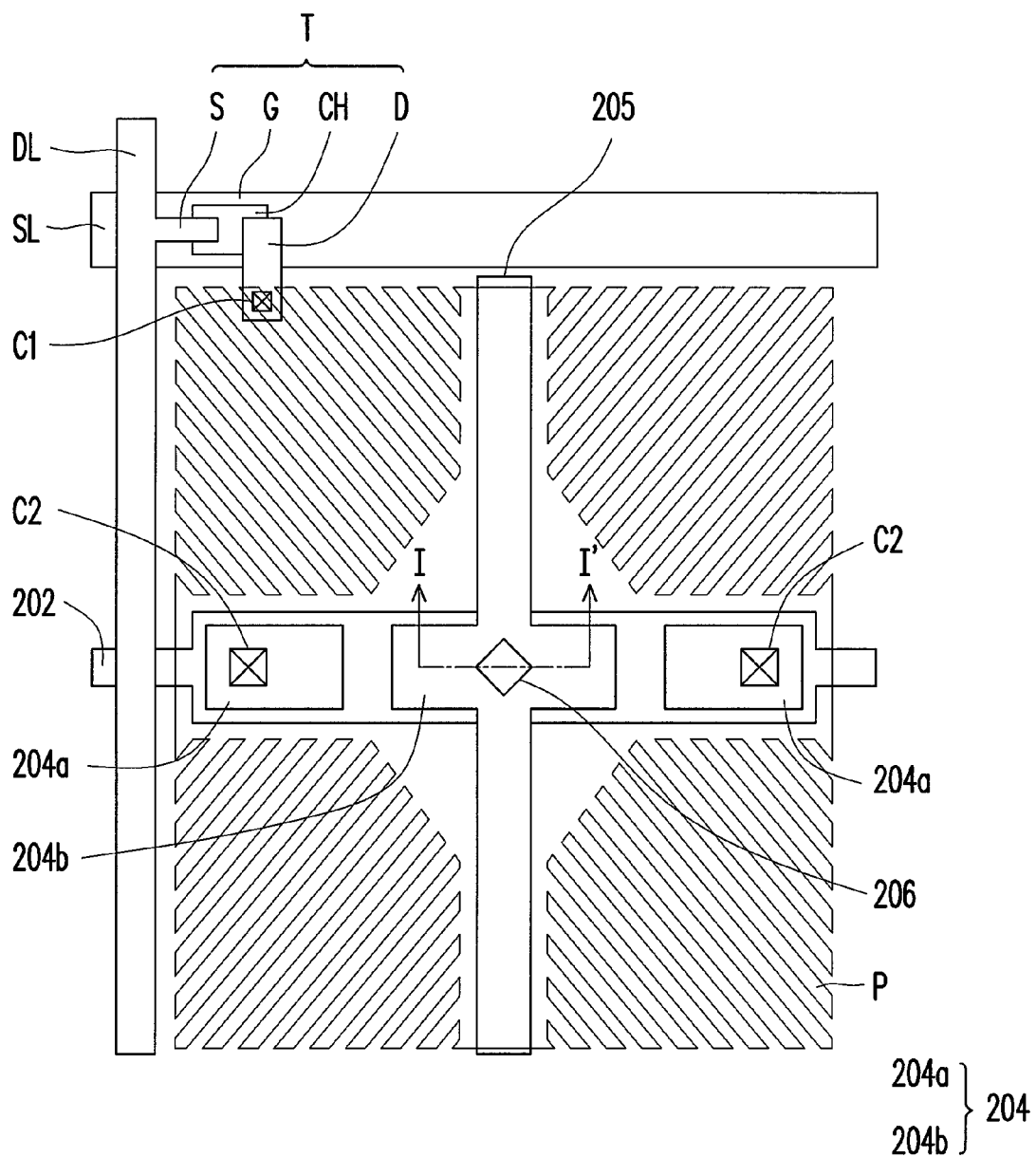
FIG. 2A is a schematic top view of a pixel structure according to an embodiment of the present invention.
Figure 2B:
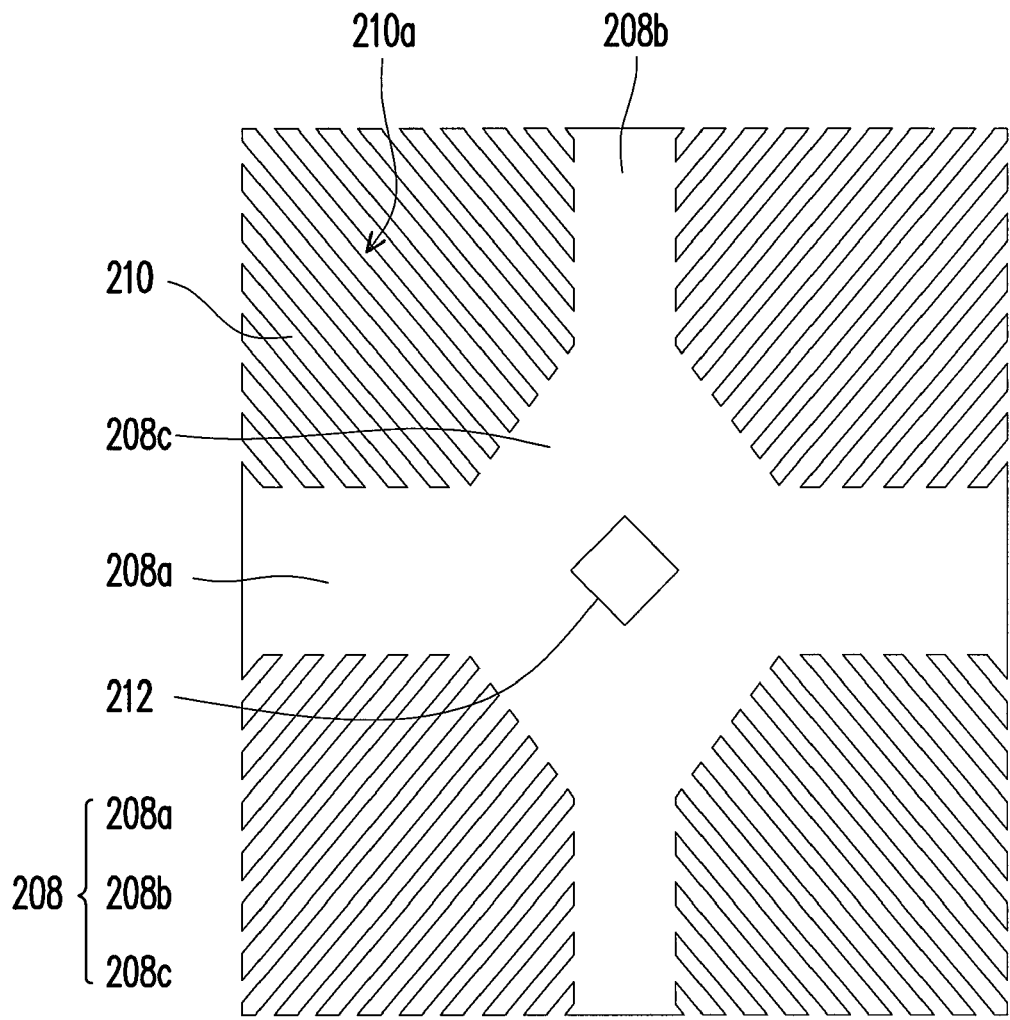
FIG. 2B is a schematic diagram showing the pixel electrode of the pixel structure of FIG. 2A.
Figure 3:
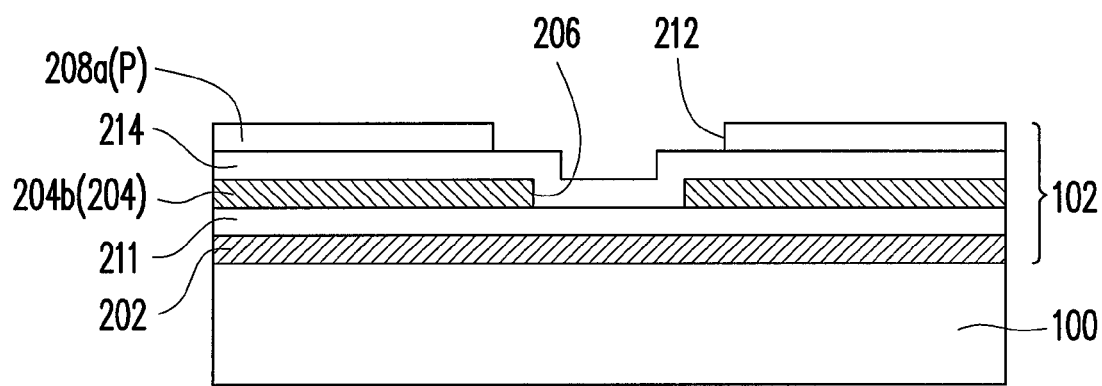
FIG. 3 is a schematic cross-sectional view taken along a line I-I' depicted in FIG. 2A.

Next, the pixel array layer 102 on the first substrate 100 is described in the following paragraphs. The pixel array layer 102 is comprised of a plurality of pixel structures. In the embodiment, each pixel structure is as shown in FIG. 2A, FIG. 2B is a schematic diagram showing the pixel electrode of the pixel structure of FIG. 2A, and FIG. 3 is a schematic cross-sectional view taken along a line I-I' depicted in FIG. 2A. Referring to FIG. 2A, FIG. 2B and FIG. 3, the pixel structure in the embodiment includes a scan line SL, a data line DL, an active device T, a capacitor electrode line 202, an upper electrode pattern 204 and a pixel electrode P.

The scan line SL and the data line DL are disposed on the first substrate 100. The scan line SL has an extending direction different from that of the data line DL. In addition, the scan line, SL and the data line DL are disposed in different film layers, and an insulating layer is sandwiched therebetween. The scan line SL and the data line DL are used to transmit the driving signals for the pixel structure.

The active device T is electrically connected to the scan line SL and the data line DL. Herein, the active device T is a thin film transistor comprising a gate G, a channel layer CH, a source S and a drain D. The gate G is electrically connected to the scan line SL, the source S is electrically connected to the data line DL. That means, when a controlling signal is input into the scan line SL, the scan line SL and the gate G are electrically connected to each other. When a controlling signal is input into the data line DL, the data line DL and the source S are electrically connected to each other. The channel layer CH is disposed above the gate G and under the source S and the drain D. In the embodiment, the active device T is a bottom gate thin film transistor for illustration, but it is not limited in the present invention. According to the present embodiment, the active device T is, for example, a top-gate thin film transistor.

The capacitor electrode line 202 is disposed on the first substrate 100. The capacitor electrode 202 has an extending direction parallel to that of the scan line SL. According to the embodiment, the capacitor electrode line 202 and the scan line SL are formed simultaneously, and thus the capacitor electrode line 202 and the scan line SL are in the same layer. In an embodiment, the capacitor electrode lines 202 in the pixel structures are electrically connected to a common voltage.

The upper electrode pattern 204 is disposed above the capacitor electrode line 202, and the upper electrode pattern 204 has a first opening 206 therein to expose the capacitor electrode pattern 202 under the upper electrode pattern 204. In details, the upper electrode pattern 204 overlaps with the capacitor electrode line 202 and an insulating layer 211 is sandwiched therebetween, such that the upper electrode pattern 204 is electrically isolated from the capacitor electrode line 202, as shown in FIG. 3. The first opening 206 in the upper electrode pattern 204 exposes the insulating layer 211 on the capacitor electrode line 202. According to the embodiment, the upper electrode pattern 204 and the data line DL are formed simultaneously, and thus the upper electrode pattern 204 and the data line DL are in the same layer.

In the embodiment, the upper electrode pattern 204 comprises a first part 204a and a second part 204b, and the first opening 206 is disposed in the second part 204b. Moreover, the first part 204a and the second part 204b are separated from each other. In FIG. 2A, the first part 204a is disposed beside the second part 204b. However, the present invention is not limited herein. In another embodiment, the first part 204a is only disposed at one side of the second part 204b, or the first parts 204a and the second parts 204b are connected to each other.

In one embodiment of the present invention, the pixel structure further comprises a shielding line 205. The shielding line 205 is parallel to the data line DL and disposed at the middle of the pixel structure. In the embodiment, the shielding line 205 and the data line DL are formed at the same time, and thus the shielding line 205 can directly connect to the second part 204b of the upper electrode pattern 204. However, the present invention does not limit to this embodiment. According to another embodiment, the shielding line 205 and the scan line SL are formed at the same time.

It is noted that the shielding line 205 mainly has a function of shielding the tilting of the liquid crystal molecules above the shielding line 205 to not be observed. Therefore, the display panel having the shielding line 205 therein has better display quality. However, the present invention does not limit to have to form the shielding line. In other words, in another embodiment, the shielding line 205 may be omitted.

The pixel electrode P is electrically connected to the active device T. In the embodiment, the pixel electrode P is electrically connected to the drain D of the active device T. More specifically, a contact window C1 is further disposed in an overlapping region between the pixel electrode P and the drain D of the active device T, so as to electrically connect the pixel electrode P and the drain D. In addition, the pixel electrode P covers the capacitor electrode line 202 and the upper electrode pattern 204, and an insulating layer 214 (as shown in FIG. 3) is sandwiched between the pixel electrode P and the upper electrode pattern 204. Moreover, a contact window C2 is formed between the pixel electrode P and the first part 204a of the upper electrode pattern 204, so as to electrically connect the pixel electrode P and the first part 204a of the upper electrode pattern 204. In other words, the pixel electrode P and the first part 204a of the upper electrode pattern 204 have the same electric potential through the contact window C2. In addition, since the first part 204a of the upper electrode patter 204 electrically couples with the capacitor electrode line 202, the electric charges of the pixel electrode P can be stored herein, so as to form a storage capacitor of the pixel structure.

Moreover, the pixel electrode P comprises a middle portion 208 and a plurality of branches 210 connecting with the middle portion 208. In particular, the middle portion 208 of the pixel electrode P has a second opening 212 therein, and the second opening 212 exposes the first opening 206. In details, as shown in FIG. 3, the insulating layer 214 fills into the first opening 206 formed in the upper electrode pattern 204, and the second opening 212 exposes the insulating layer 214 on the first opening 206. According to the embodiment, the second opening 212 in the middle portion 208 of the pixel electrode P has a width greater than that of first opening 206 in the second part 204b of the upper electrode pattern 204. Moreover, in the embodiment, the width of the first opening 212 in the middle portion 208 of the pixel electrode P is greater than twice of the thickness of the display medium 150 between the first substrate 100 and the second substrate 110 as shown in FIG. 1.

In addition, the branches 210 of the pixel electrode P extend along four directions from the middle portion 208. That is, the branches 210 extend to the edge of the pixel structure from the middle portion 208 along four directions. The spaces between the branches 210 are also called alignment slits 210a.

According to the embodiment, the middle portion 208 of the pixel electrode P comprises a horizontal extending part 208a, a vertical extending part 208b and a block part 208c. The horizontal extending part 208a is correspondingly disposed above the capacitor electrode line 202. The vertical extending part 208b is disposed perpendicular to the horizontal extending part 208a and correspondingly disposed above the shielding line 205. The block part 208c is disposed at a cross portion of the horizontal extending part 208a and the vertical part 208b, and thereby the horizontal extending part 208a and the vertical extending part 208b extend along four directions from the block part 208c. In the embodiment, the block part 208c directly connects to the horizontal extending part 208a and the vertical extending part 208b. In addition, the block part 208c is mainly disposed at the center of the pixel structure.

According to above mentioned, there is no slit formed in the middle portion 208 of the pixel electrode P in the embodiment, and thus comparing with the pixel structure of a conventional PSA display panel whose slits are formed in the whole pixel electrode, the area occupied by the slits 210a in the pixel electrode P of the embodiment is smaller. Since the area occupied by the alignment slits in the pixel electrode P is decreased in the embodiment, the display mura generated from the alignment slits having non-identical widths due to the photolithography process is reduced.

Moreover, in the embodiment, the second opening 212 is formed in the pixel electrode P and the first opening 206 is formed in the upper electrode pattern 204, and therefore the capacitor electrode line 202 under the first opening 206 and the second opening 212 is exposed. When the curing process of the PSA technology is performed to the display panel of the embodiment, which is applying a high voltage to the capacitor electrode line 202, the high voltage on the capacitor electrode line 202 may pass through the first opening 206 and the second opening 212 to align the liquid crystal molecules above the second opening 212 directly. In other words, because the liquid crystal molecules have a characteristic of tilting toward the high voltage, the liquid crystal molecules above the middle portion 208 of the pixel electrode P are specifically aligned according to the voltage influence through the first opening 206 and the second opening 212. Therefore, even though there is no slit formed in the middle portion 208 of the pixel electrode P, the liquid crystal molecules above the middle portion 208 are still specifically aligned by the voltage through the first opening 206 and the second opening 212.

That is to say, the middle portion 208 of the pixel electrode P is a non-patterned electrode pattern so as to reduce the area occupied by the alignment slits in the pixel electrode. The second opening 212 is formed in the middle opening 208 of the pixel electrode P, and the first opening 206 is formed under the second opening 212. Hence, the liquid crystal molecules above the middle portion 208 of the pixel electrode P are still aligned by the voltage applied on the capacitor electrode line 202. Therefore, the pixel structure of the embodiment not only has the same alignment effect with the conventional PSA pixel structure, but also has an advantage of decreasing the area occupied by the alignment slits in the pixel electrode P, so as to reduce display mura generated from the alignment slits having non-identical widths due to the photolithography process.

In the embodiment of FIG. 2A and FIG. 2B, the block part 208c of the middle portion 208 of the pixel electrode P is diamond-shaped, but the present invention does not limit herein. According to another embodiment, the block part 208c may have the other shape.

Figure 4A:
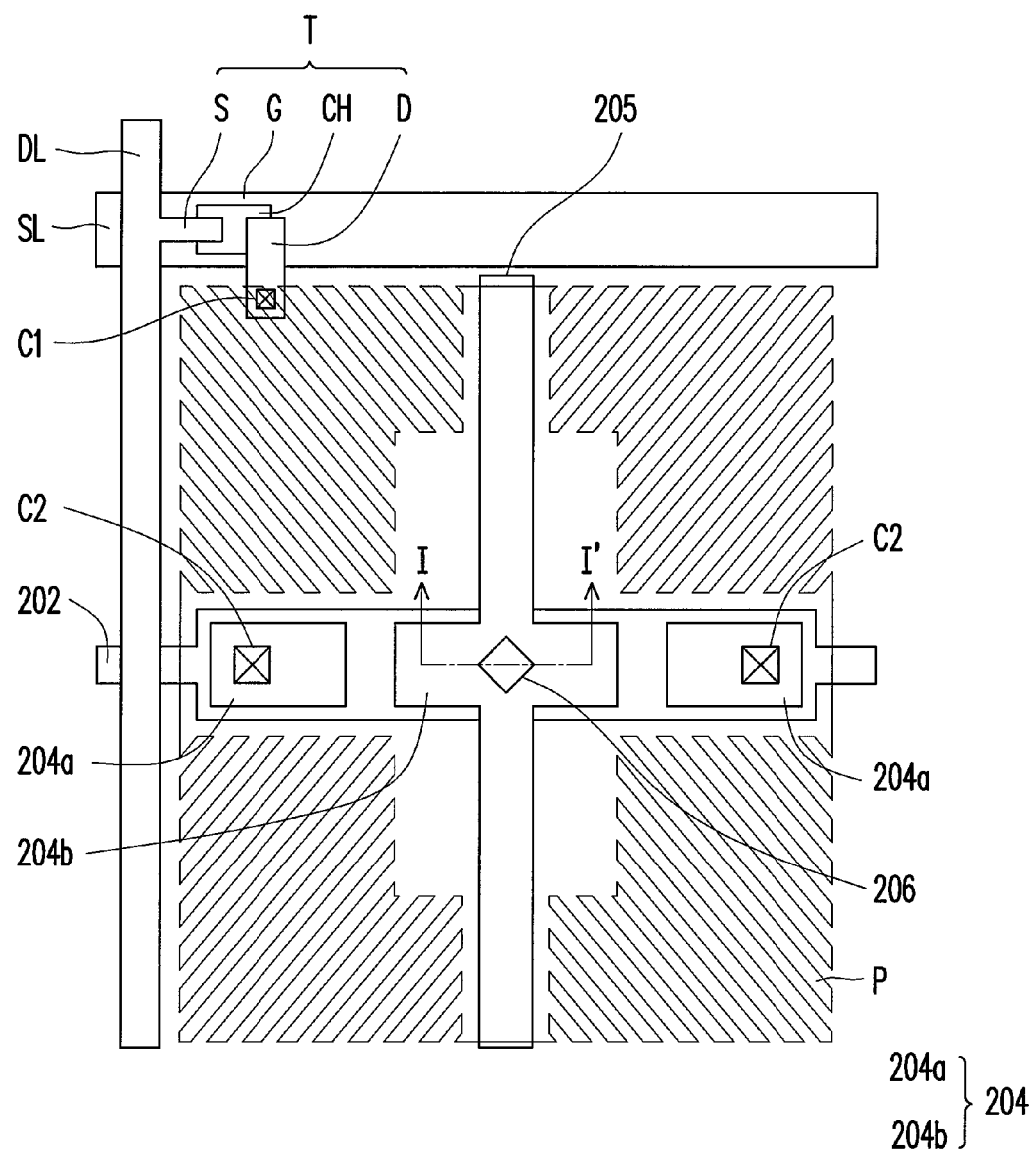
FIG. 4A is a schematic top view of a pixel structure according to an embodiment of the present invention.
Figure 4B:
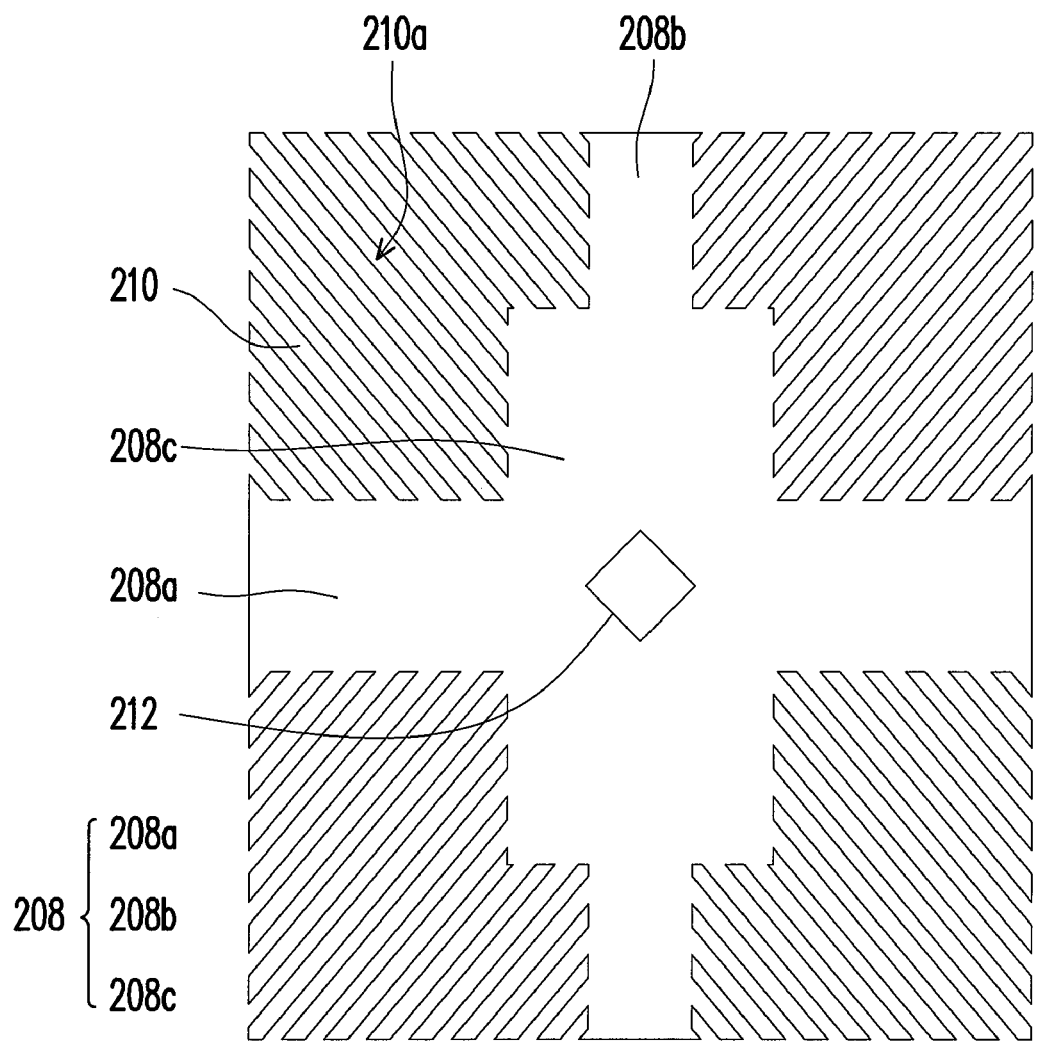
FIG. 4B is a schematic diagram showing the pixel electrode of the pixel structure of FIG. 4A.

FIG. 4A is a schematic top view of a pixel structure according to another embodiment of the present invention, and FIG. 4B is a schematic diagram showing the pixel electrode of FIG. 4A. The embodiment shown in FIG. 4A and FIG. 4B is similar to the embodiment shown in FIG. 2A and FIG. 2B so that components identical to those of FIG. 2A and FIG. 2B will be denoted with the same numerals in FIG. 4A and FIG. 4B and not repeated herein. The difference between the embodiment of FIG. 4A and FIG. 4B and the embodiment of FIG. 2A and FIG. 2B is that the block part 208c of the middle portion 208 of the pixel electrode P has a shape of rectangle or square. The block part 208c is designed to have the rectangular shape or the square shape which may further reduce the area occupied by the alignment slits 210a in the pixel electrode P.

According to other embodiments, in addition to the diamond-shape and the rectangular shape or the square shape, the block part 208c may also have the other shape, such as a circle, a triangle or a polygon.

Figure 5A:
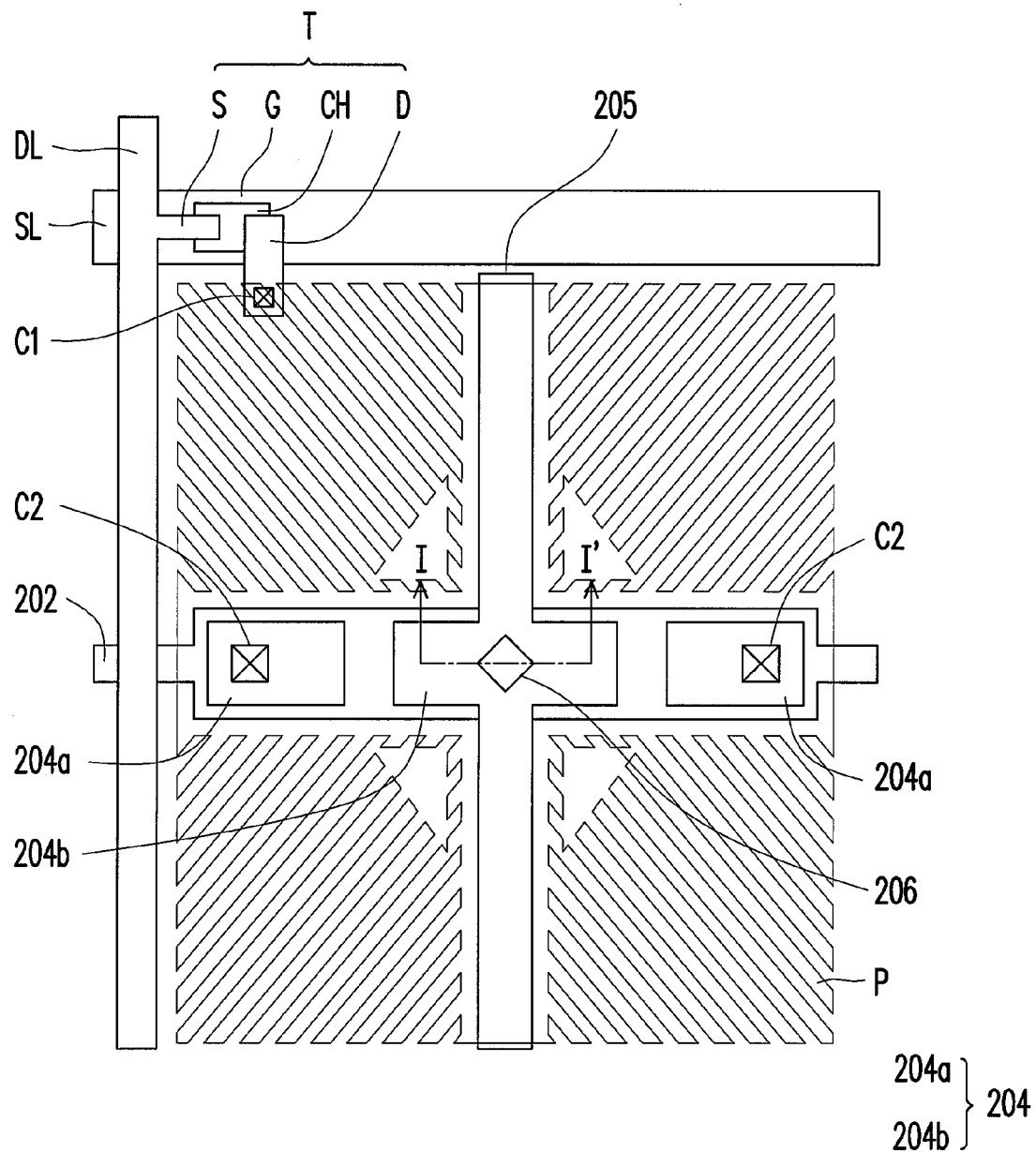
FIG. 5A is a schematic top view of a pixel structure according to an embodiment of the present invention.
Figure 5B:
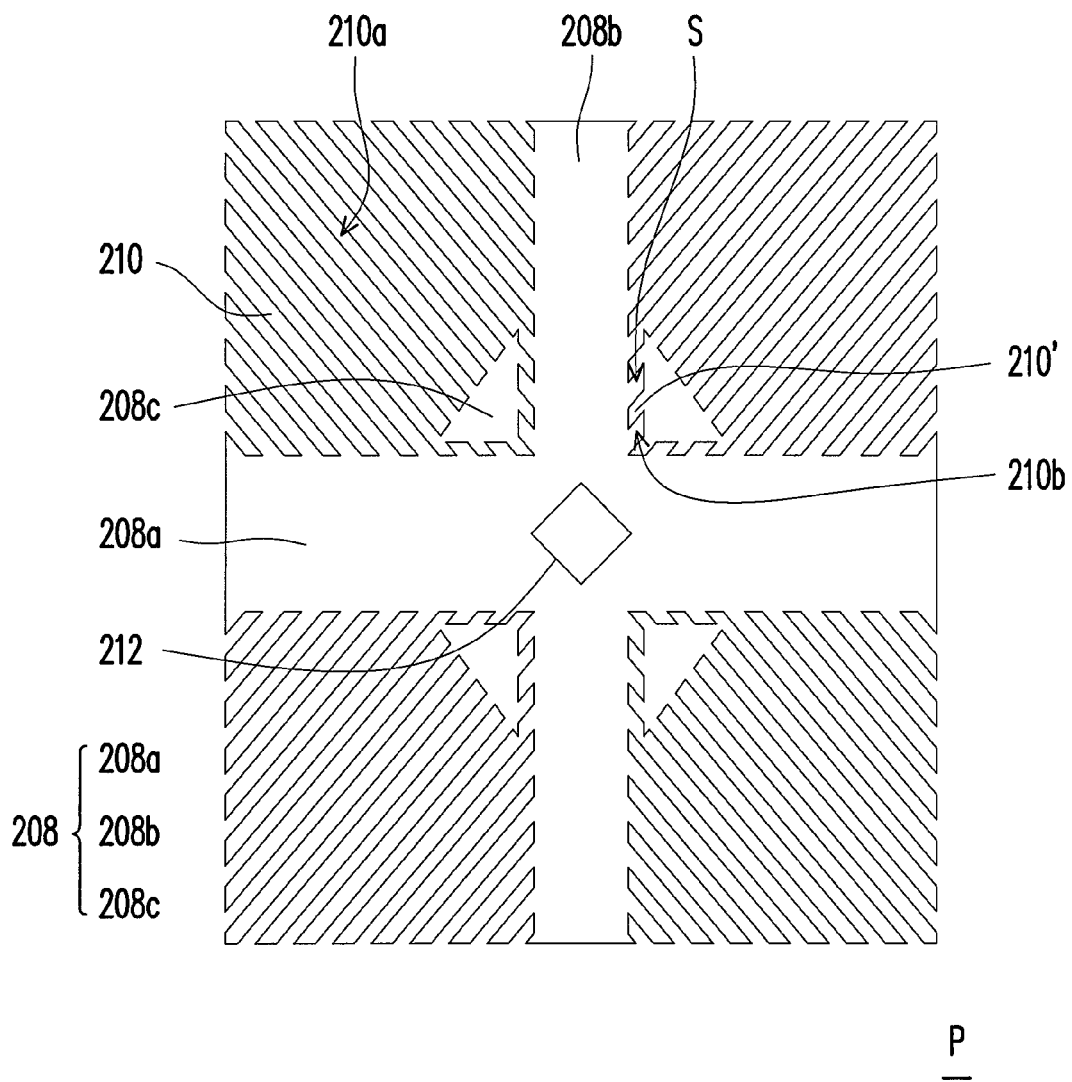
FIG. 5B is a schematic diagram showing the pixel electrode of the pixel structure of FIG. 5A.

FIG. 5A is a schematic top view of a pixel structure according to another embodiment of the present invention, and FIG. 5B is a schematic diagram showing the pixel electrode of the pixel structure of FIG. 5A. The embodiment shown in FIG. 5A and FIG. 5B is similar to the embodiment shown in FIG. 2A and FIG. 2B so that components identical to those of FIG. 2A and FIG. 2B will be denoted with the same numerals in FIG. 5A and FIG. 5B and not repeated herein. The difference between the embodiment of FIG. 5A and FIG. 5B and the embodiment of FIG. 2A and FIG. 2B is the middle portion 208 of the pixel electrode P, in which a gap S is disposed between the block part 208c and the horizontal extending part 208a and between the block part 208c and the vertical extending part 208b. That is, the block part 208c does not completely connect to the horizontal extending part 208a and the vertical extending part 208b.

For details, the block part 208c may be divided into four blocks respectively disposed at the sides of the horizontal extending part 208a and the vertical extending part 208b. In addition, there are several sub-branches 210' in the gap S between the block part 208c and the vertical extending part 208b, and a slit 210b may also be formed between the two adjacent sub-branches 210'. Similarly, there are several sub-branches 210' in the gap S between the block part 208c and the horizontal extending part 208a, and a slit 210b may also be formed between the two adjacent sub-branches 210'.

Figure 6A:
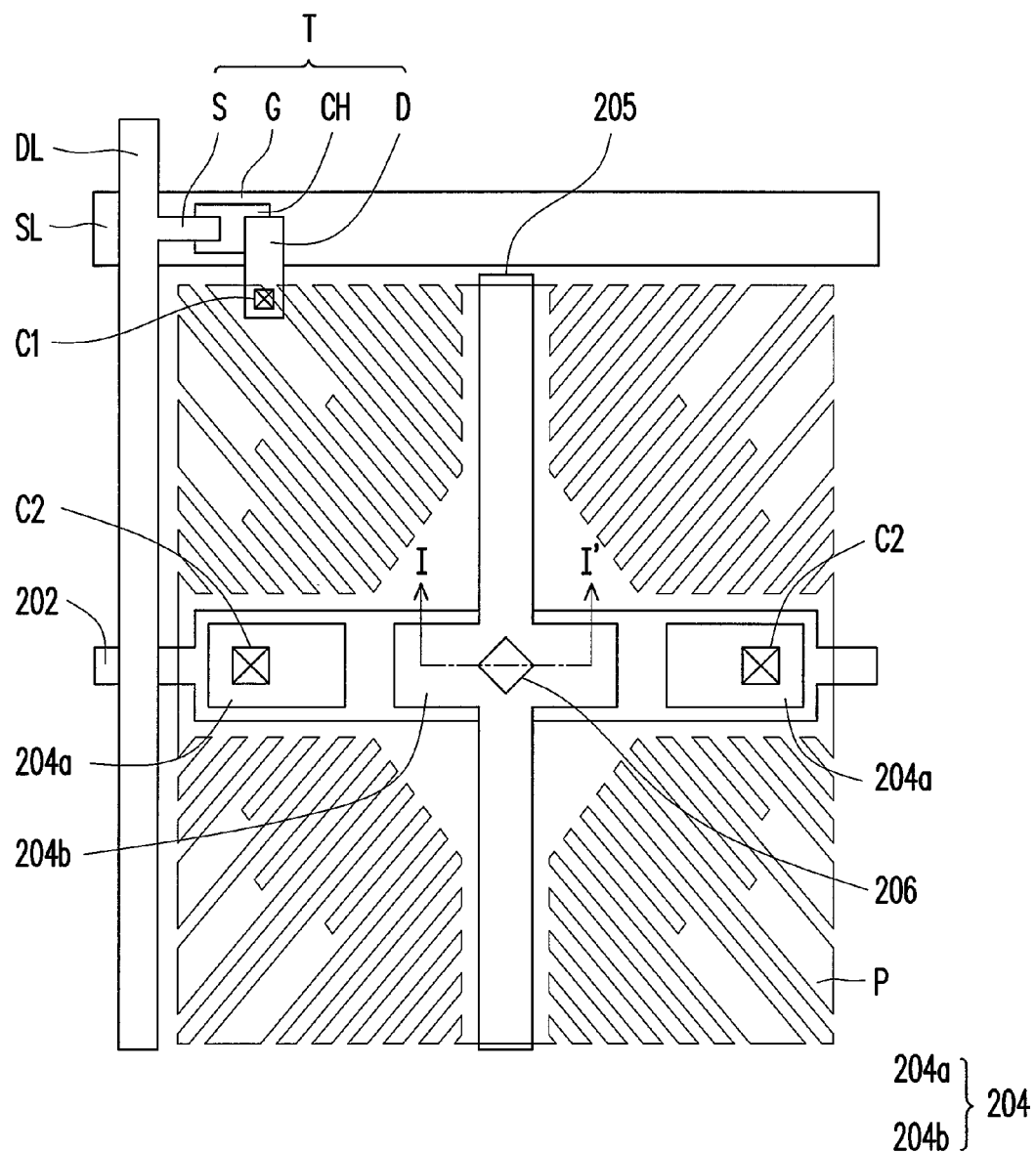
FIG. 6A is a schematic top view of a pixel structure according to an embodiment of the present invention.
Figure 6B:
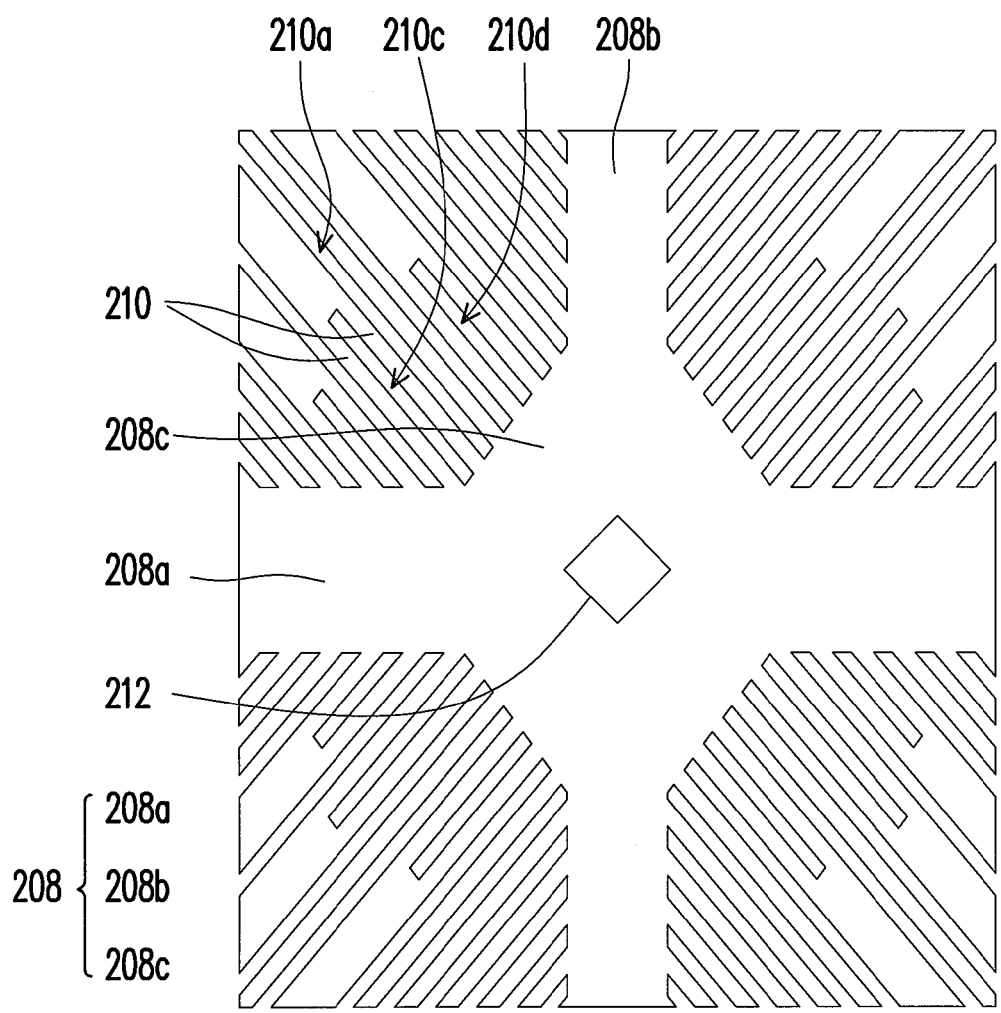
FIG. 6B is a schematic diagram showing the pixel electrode of the pixel structure of FIG. 6A.

FIG. 6A is a schematic top view of a pixel structure according to another embodiment of the present invention, and FIG. 6B is a schematic diagram showing the pixel electrode of FIG. 6A. The embodiment shown in FIG. 6A and FIG. 6B is similar to the embodiment shown in FIG. 2A and FIG. 2B so that components identical to those of FIG. 2A and FIG. 2B will be denoted with the same numerals in FIG. 6A and FIG. 6B and not repeated herein. The difference between the embodiment of FIG. 6A and FIG. 6B and the embodiment of FIG. 2A and FIG. 2B is that the lengths of the alignment slits 210a between the branches 210 of the pixel electrode P may not be the same. For example, as the drawing shown, the length of the alignment slit 210c is larger than the length of the alignment slit 210d. In addition, the alignment slit 210c and the alignment slit 210d have a design different from that of the alignment slits 210a. The alignment slits 210a extend to the edge of the pixel structure from the middle portion 208, while the alignment slit 210c and the alignment slit 210d do not extend to the edge of the pixel structure. Thereby, the branches 210 beside the alignment slit 210c or beside the alignment slit 210d are partially connected to each other.

It is noted that the alignment slit 210c and the alignment slit 210d may be randomly designed between the branches 210. For instance, one alignment slit 210c or one alignment slit 210d is formed in an interval of two-branches 210, or in an interval of three or more-branches 210.

According to the aforementioned, the upper electrode pattern of the pixel structure has the first opening therein, and the middle portion of the pixel electrode has the second opening therein. When the curing process of the PSA technology is performed, the liquid crystal molecules are aligned by the high voltage applied on the capacitor electrode line through the first opening and the second opening, so that the liquid crystal molecules have specific pre-tilt angles. Therefore, the area occupied by the alignment slits in the pixel electrode is decreased, such that the display mura generated from the alignment slits having non-identical widths due to the photolithography process is reduced.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A pixel structure, comprising:
   a scan line and a data line, disposed on a substrate;
   an active device, electrically connected to the scan line and the data line;
   a capacitor electrode line, disposed on the substrate; and
   an upper electrode pattern, disposed above the capacitor electrode line, wherein the upper electrode pattern has a first opening therein to expose the capacitor electrode line; and
   a pixel electrode, electrically connected with the active device and covering the capacitor electrode line and the upper electrode pattern, wherein the pixel electrode comprises a middle portion and a plurality of branches connecting to the middle portion, and the middle portion has a second opening therein to expose the first opening.

2. The pixel structure of claim 1, further comprising:
   a first insulating layer, disposed between the capacitor electrode line and the upper electrode pattern, wherein the first opening exposes the first insulating layer on the capacitor electrode line; and
   a second insulating layer, disposed between the pixel electrode and the upper electrode pattern, wherein the second insulating layer fills into the first opening, and the second opening exposes the second insulating layer on the first opening.

3. The pixel structure of claim 1, wherein the second opening has a width greater than that of the first opening.

4. The pixel structure of claim 1, wherein the branches of the pixel electrode extend along four directions from the middle portion.

5. The pixel structure of 1, wherein the middle portion of the pixel electrode comprises:
   a horizontal extending part, correspondingly disposed above the capacitor electrode line;
   a vertical extending part, perpendicular to the horizontal extending part; and
   a block part, disposed at a cross portion of the horizontal extending part and the vertical extending part.

6. The pixel structure of claim 5, wherein the block part directly connects to the horizontal extending part and the vertical extending part.

7. The pixel structure of claim 5, wherein there is a gap between the block part and the horizontal extending part and between the block part and the vertical extending part.

8. The pixel structure of claim 7, further comprising a plurality of sub-branches disposed in the gap between the block part and the horizontal extending part and the gap between the block part and the vertical extending part.

9. The pixel structure as claimed in claim 5, further comprising a shielding line disposed under the vertical extending part.

10. The pixel structure as claimed in claim 9, wherein the shielding line and the scan line are in the same layer, or the shielding line and the data line are in the same layer.

11. The pixel structure of claim 1, wherein there is a slit between the two adjacent branches of the pixel electrode, and the slits have different lengths.

12. The pixel structure of claim 10, wherein parts of the adjacent branches of the pixel electrode are partially connected to each other.

13. The pixel structure of claim 1, wherein the upper electrode pattern comprises a first part and a second part, the first part is electrically connected to the pixel electrode, and the first opening is disposed in the second part.

14. The pixel structure of claim 13, wherein the first part and the second part are separated from each other.

15. A display panel, comprising:
   a first substrate, having a plurality of pixel structures thereon, wherein each pixel structure is as claimed in claim 1;
   a second substrate, disposed opposite to the first substrate and having an electrode layer thereon; and
   a display medium, sandwiched between the first substrate and the second substrate.

16. The display panel of claim 15, wherein the first opening of the pixel structure has a width greater than twice of a thickness of the display medium between the first substrate and the second substrate.

17. The display panel as claimed in claim 15, wherein there is not any alignment pattern disposed on or in the electrode layer on the second substrate.

* * * * *